US007059612B2

(12) United States Patent
Kuribayashi

(10) Patent No.: US 7,059,612 B2
(45) Date of Patent: Jun. 13, 2006

(54) GASKET

(75) Inventor: Akira Kuribayashi, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/945,879

(22) Filed: Sep. 22, 2004

(65) Prior Publication Data

US 2005/0062234 A1    Mar. 24, 2005

(30) Foreign Application Priority Data

Sep. 24, 2003    (JP)    ............................. 2003-332345

(51) Int. Cl.
$F16J\ 15/02$    (2006.01)
(52) U.S. Cl. ..................... 277/637; 277/651; 277/649; 411/542; 411/903; 411/371.1
(58) Field of Classification Search ................ 277/626, 277/644, 651, 611, 638, 637, 616; 411/531, 411/533, 900–903, 543, 976, 977
See application file for complete search history.

(56) References Cited

U.S. PATENT DOCUMENTS 3,191,950 A * 6/1965 Hiltner ..................... 277/611
3,259,404 A * 7/1966 Papenguth .................. 285/212
5,183,267 A * 2/1993 Ackerman et al. .......... 277/630
6,260,854 B1 * 7/2001 Lemon ....................... 277/609
6,328,313 B1   12/2001 Teranishi et al.
6,761,360 B1 * 7/2004 Hammi ....................... 277/630

FOREIGN PATENT DOCUMENTS

| JP | 10-501873 | 2/1988 |
| JP | 63-111391 | 5/1988 |
| JP | 2-236089 | 9/1990 |
| JP | 5-73362 | 10/1993 |
| JP | 2000-145969 | 5/2000 |
| WO | WO 95/34775 | 12/1995 |

* cited by examiner

*Primary Examiner*—Jong-Suk (James) Lee
*Assistant Examiner*—Gilbert Lee
(74) *Attorney, Agent, or Firm*—Paul A. Guss

(57) ABSTRACT

A gasket comprises a ring member made of a metal material, and a covering section composed of an elastic material, wherein the covering section integrally covers side surfaces and an inner circumferential surface of the ring member respectively. First to third protruding sections, which protrude radially inwardly by predetermined lengths and which have linear side sections, are provided on an inner circumference of the covering section.

7 Claims, 10 Drawing Sheets

GASKET

BACKGROUND OF THE INVENTION

1. Field of the Invention

The present invention relates to a gasket which is installed, for example, to a male thread section of a tube joint and which makes it possible to effectively seal opposing surfaces at a connecting portion between the tube joint and another member when the tube joint is connected to the other member by the aid of the male thread section.

2. Description of the Related Art

A gasket has been hitherto used as a member that is installed, for example, to a male thread section of a tube joint and which seals a connecting portion by being interposed between the tube joint and another member when the tube joint is connected to the other member by the aid of the male thread section.

A conventional gasket structure is disclosed, for example, in Japanese Laid-Open Utility Model Publication No. 5-73362, and comprises a ring-shaped core section formed by a hard material such as a metal, and a covering section that covers an upper surface, a lower surface, and a circular inner circumferential surface of the core section with an elastically deformable material such as nitrile rubber.

Another gasket structure is disclosed in Japanese Laid-Open Patent Publication No. 2000-145969, and has a flat metal thin plate having a circular bore hole formed at a central portion and further having a protruding bead composed of an adhesive formed on a joining surface disposed adjacent to the bore hole of the metal thin plate.

Japanese Laid-Open Patent Publication No. 10-501873 (PCT) (WO95/34775) also discloses a gasket, comprising a bead having a lateral cross-sectional shape formed with a flat bottom surface, two inclined side surfaces extending upwardly and inclining inwardly from a portion thereof that intersects with the bottom surface, and a convexly curved top surface adjoining the side surfaces.

However, when the gaskets according to the conventional techniques disclosed in Japanese Laid-Open Utility Model Publication No. 5-73362, Japanese Laid-Open Patent Publication No. 2000-145969, and Japanese Laid-Open Patent Publication No. 10-501873 (PCT) (WO95/34775) are assembled, for example, to a male thread section of another member that extends vertically downward, the gasket tends to fall or drop off during transport after the gasket has been installed onto the male thread section. This occurs because the bore hole, which is formed at a central portion of the metal thin plate (core section) of the gasket has an inner diameter that is larger than an outer diameter of the male thread section to which the gasket is installed.

SUMMARY OF THE INVENTION

A general object of the present invention is to provide a gasket, which makes it possible to avoid falling or dropping off of the gasket after being assembled, for example, to another object such as a male thread section.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
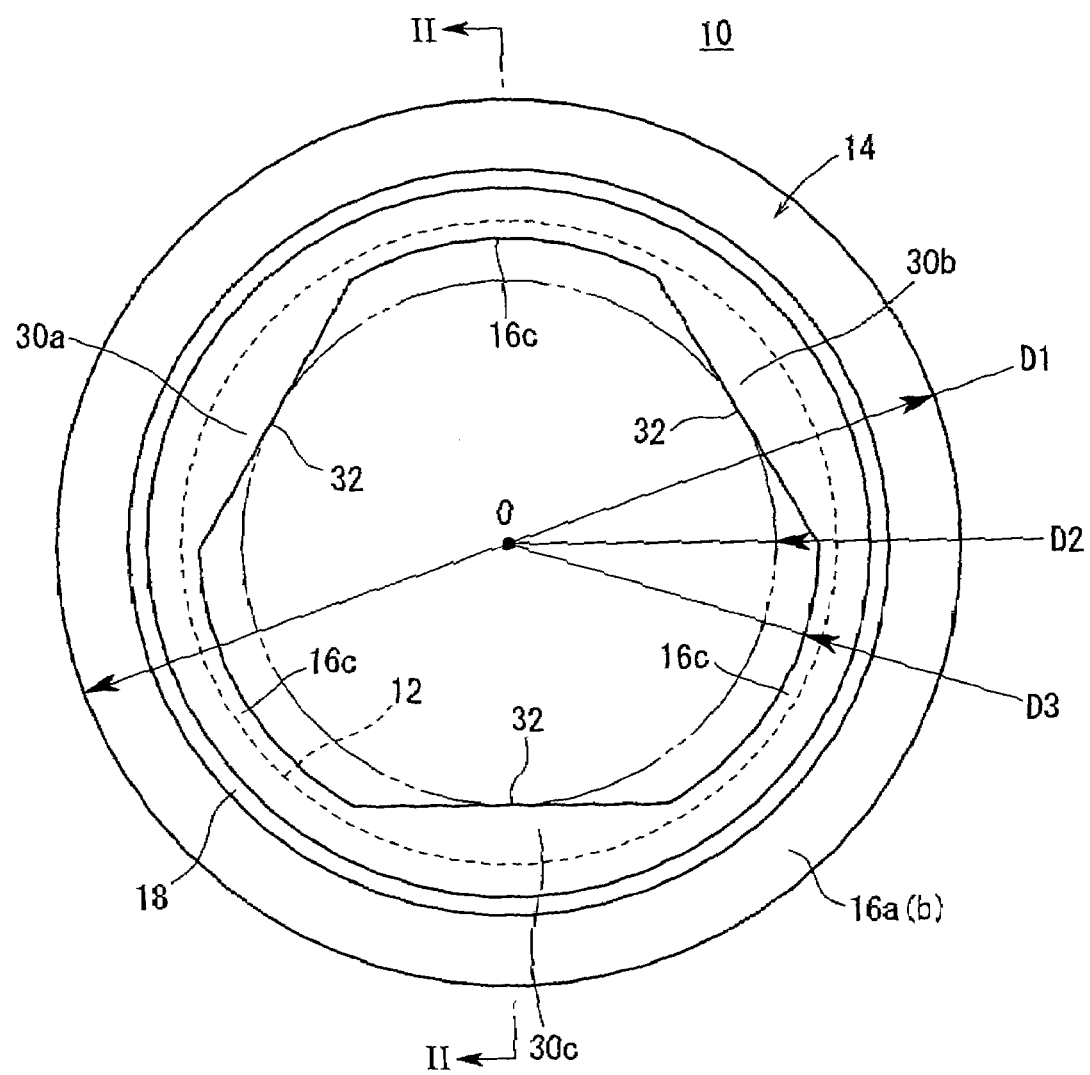
FIG. 1 shows a plan view illustrating a gasket according to an embodiment of the present invention.
Figure 2:
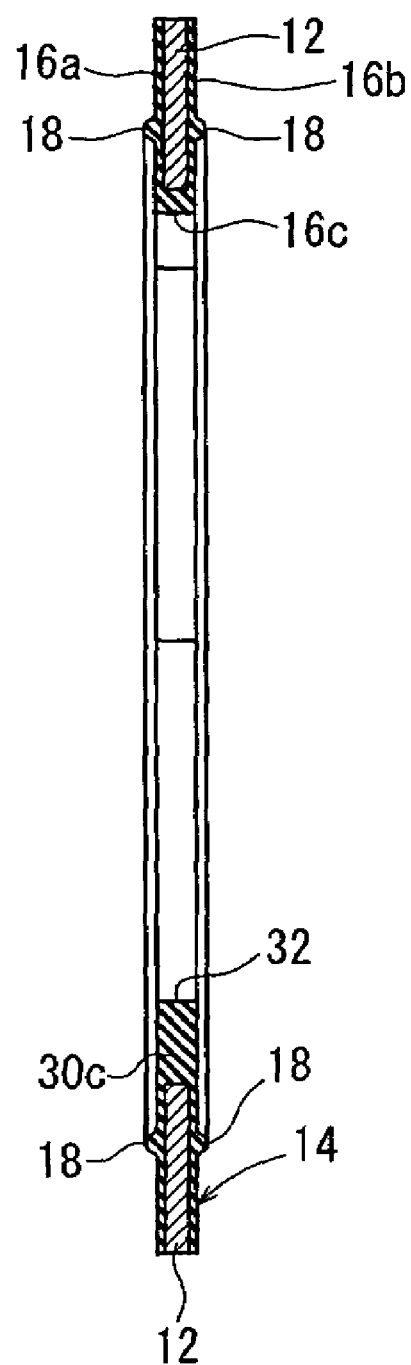
FIG. 2 shows a vertical sectional view taken along line II—II in FIG. 1.

As shown in FIGS. 1 and 2, reference numeral 10 indicates a gasket according to an embodiment of the present invention.

The gasket 10 comprises a thin plate-shaped ring member 12 that is formed, for example, from a metal material such as SUS 304 (based on Japanese Industrial Standard), and a covering section 14 composed, for example, of an elastic material such as nitrile rubber (NBR) and which integrally covers a first side surface, a second side surface, and an inner circumferential surface of the ring member 12 respectively.

Figure 3:
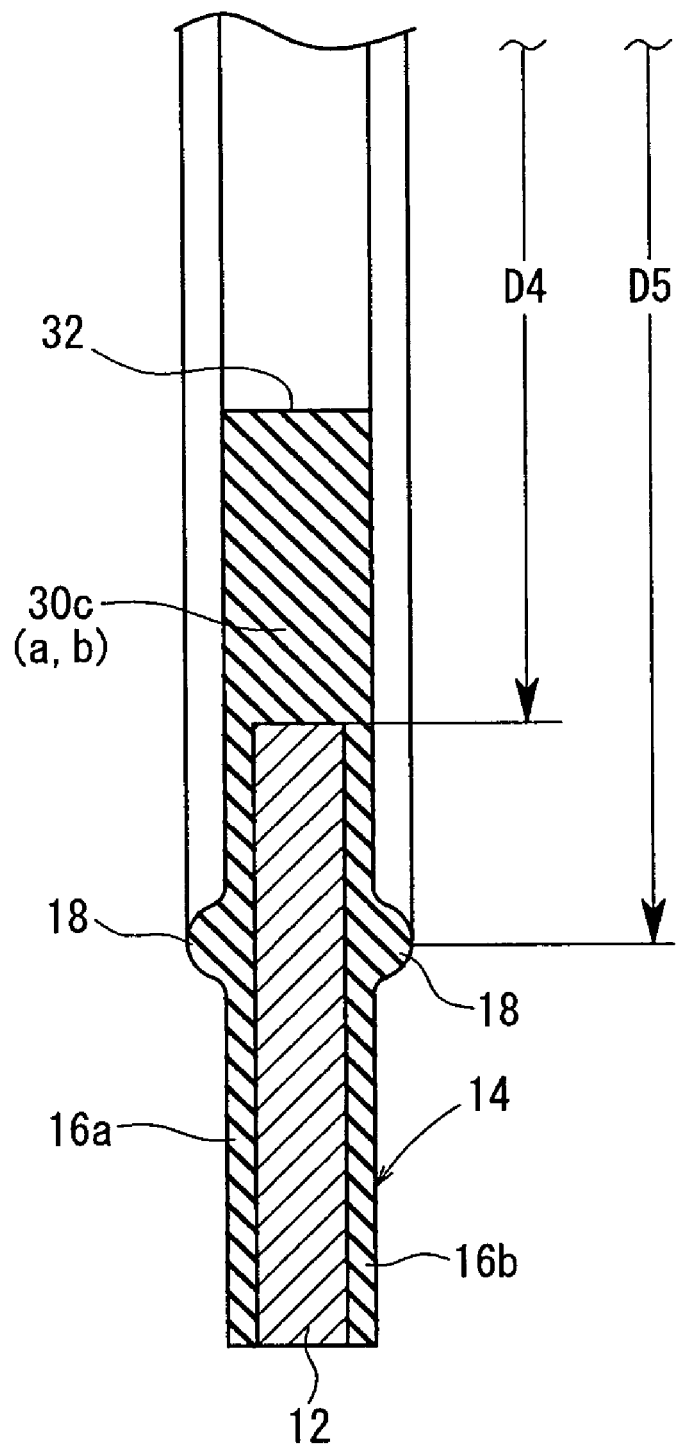
FIG. 3 shows a partial magnified vertical sectional view illustrating a covering section shown in FIG. 2 in greater detail.

As shown in FIGS. 2 and 3, the covering section 14 has a first side surface section 16a that covers the first side surface of the ring member 12, a second side surface section 16b that covers the second side surface of the ring member 12, and a thick-walled inner circumferential section 16c that covers the inner circumferential surface of the ring member 12. The first side surface section 16a, the second side surface section 16b, and the inner circumferential section 16c respectively are formed in an integrated manner.

Annular beads 18, which expand in a perpendicular direction from the first side surface and the second side surface of the ring member 12, are formed respectively at predetermined positions on the first side surface section 16a and the second side surface section 16b of the covering section 14. The bead 18 of the first side surface section 16a is formed to have the same cross-sectional shape as that of the bead 18 of the second side surface section 16b.

In the present embodiment, as shown in FIG. 3, a single bead 18 is formed on each of the first side surface section 16a and the second side surface section 16b of the covering section 14. However, the invention is not necessarily limited to such a structure. Alternatively, a plurality of beads 18, as described above, which are separated from each other by predetermined spacing distances, may be formed on each of the first side surface section 16a and the second side surface section 16b.

Figure 4:
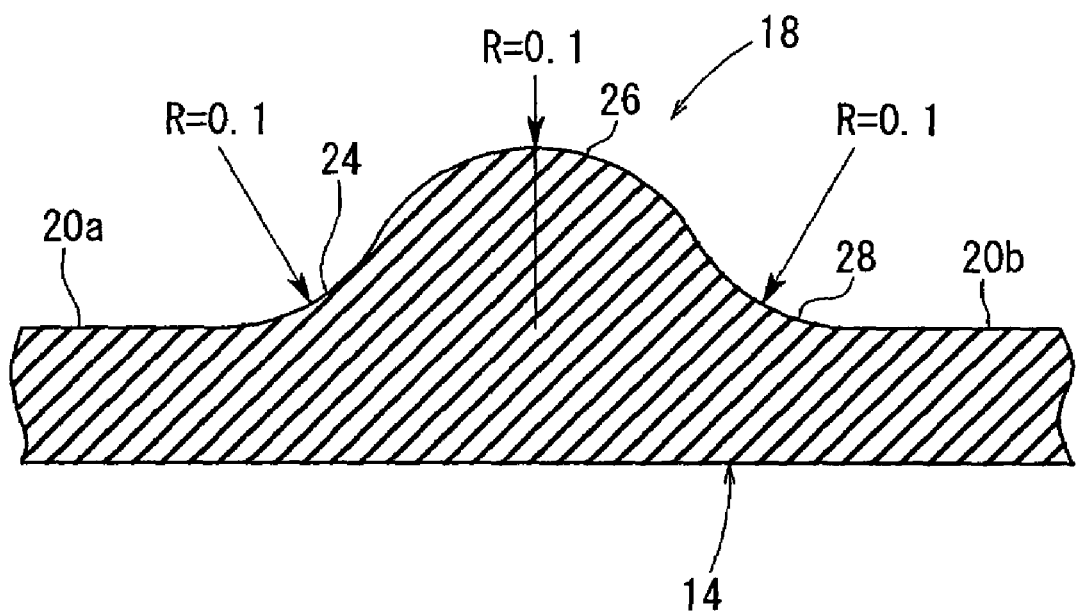
FIG. 4 shows a partial magnified vertical sectional view illustrating a bead shown in FIG. 3 in greater detail.

As shown in FIG. 4, the cross-sectional shape of the bead 18 is defined by a first lower slope section 24 that rises from a flat surface section 20a of the covering section 14 and having a radius of curvature R of about 0.1 (mm), a top section 26 that continues from the first lower slope section 24 and which has a radius of curvature R of about 0.1 (mm), and a second lower slope section 28 that continues from the top section 26 to a flat surface section 20b of the covering section 14 and having a radius of curvature R of about 0.1 (mm).

When the first lower slope section 24, the top section 26 and the second lower slope section 28 are formed continuously, as described above, to have the same radius of curvature R of about 0.1 (mm), a bead shape is provided that can be effectively compressed between opposing surfaces to successfully obtain good seal performance.

First to third protruding sections 30a to 30c, which protrude radially inwardly by a predetermined length at three respective positions, are provided on an inner circumferential section 16c of the covering section 14 in surrounding relation to the ring member 12 (see FIG. 1). The first to third protruding sections 30a to 30c are integrally formed with the covering section 14 and are flexible, being formed, for example, by an elastic material such as nitrile rubber (NBR).

The first to third protruding sections 30a to 30c are arranged so that they are separated from each other respectively by equal angles of 120 degrees in the circumferential direction. The first to third protruding sections 30a to 30c adjoin with circular arc-shaped inner circumferential sections 16c, each having a linear side section 32 that communicates between the adjoining inner circumferential sections 16c.

The first to third protruding sections 30a to 30c are provided at three portions along the inner circumference of the covering section 14 for the following reason. That is, if contact is made with a root section 34 of the male thread section 33 (as described later) at only two portions, the structure would be unstable. On the other hand, if contact is made at four or more portions, then the structure is substantially supported by three portions, and the additional portion or portions become unnecessary.

An explanation will now be made concerning the predetermined positioning of the beads 18 formed on the first side surface section 16a and the second side surface section 16b of the covering section 14.

Figure 5:
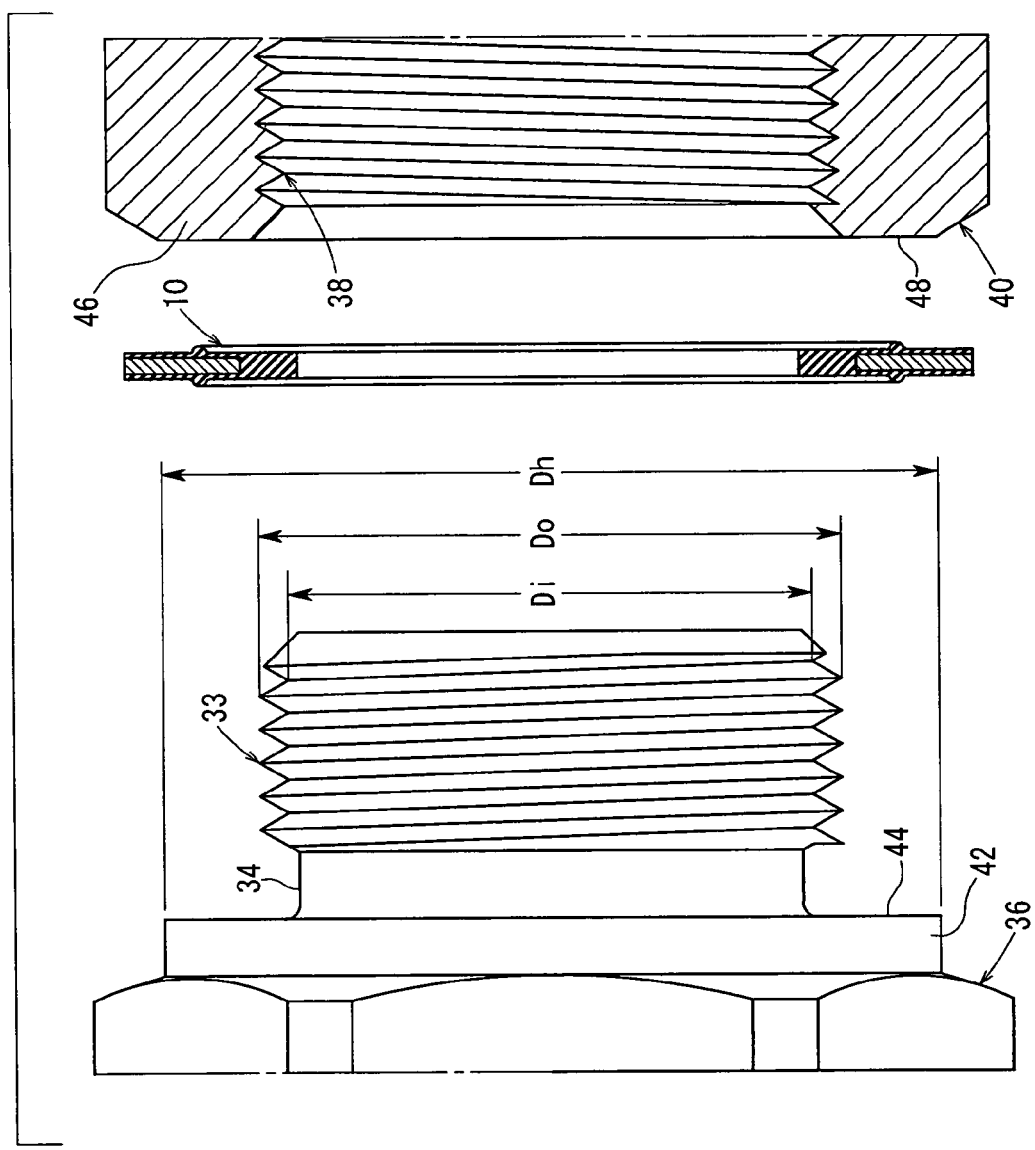
FIG. 5 is an illustrative partial vertical sectional view depicting the dimensional characteristics of a male thread section, wherein the gasket is arranged between a first member having the male thread section and a second member having a female thread section.

As shown in FIG. 5, the gasket 10 is interposed between a first member 36 having a male thread section 33 and a second member 40 formed with the female thread section 38 and which is fitted to the male thread section 33. In this arrangement, the gasket 10 makes tight contact to effect a sealing function between a first seal surface 44 formed on an annular shoulder 42 of the first member 36 and a second seal surface 48 formed on an annular side wall 46 of the second member 40.

In FIG. 5, Do represents the peak diameter, which is the outer diameter defined by the peak of the screw threads formed on the male thread section 33, Di represents the valley diameter, which is an outer diameter defined by the valley of the male thread section 33, and Dh represents the outer diameter of the annular shoulder 42 on which the first seal surface 44 is formed.

In FIG. 1, D1 represents an outer diameter of the gasket 10, having a dimension which is larger than the peak diameter Dh of the male thread section 33, e.g., wherein D1=Dh+1 (mm). D2 represents the diameter of an inscribing circle inscribing the linear side sections 32 of the first to third protruding sections 30a to 30c. D2 is set to be slightly smaller than the valley diameter Di of the male thread section 33, e.g., wherein D2=Di−0.2 (mm). When the gasket 10 is assembled onto the male thread section 33, it is necessary for the elastic force (restoring force) of the rubber material of the covering section 14 to forcibly press against the root section 34 of the male thread section 33. Therefore, D2 is formed to be smaller, by only about 0.2 (mm), than the valley diameter Di of the male thread section 33. D3 represents an inner diameter of the circularly arc-shaped inner circumferential sections 16c of the covering section 14, wherein D3 is set to have the same dimension as that of the peak diameter Do of the male thread section 33.

In FIG. 3, D4 represents the inner diameter of the ring member 12, wherein D4 is set to be slightly larger than the peak diameter Do of the male thread section 33, e.g. D4=Do+0.5 (mm), for the following reason. That is, it is necessary to provide a gap of about 0.5 (mm) so that the covering section 14 can be flexibly bent with respect to the peak diameter Do when the gasket 10 is installed onto the male thread section 33. D5 represents the bead diameter. The bead diameter D5 passes through the center O of the ring member 12 and connects to apexes on the top section 26 of the bead 18, wherein the bead 18 itself is formed to have an annular shape.

With the above arrangement, the dimension of the bead diameter D5 of the bead 18 is preferably set to have a value obtained by dividing, by 2, the sum of the inner diameter D4 of the ring member 12 and the outer diameter Dh of the annular shoulder 42 on which the first seal surface 44 is formed, i.e., wherein D5=(D4+Dh)/2, for the following reason.

That is, when the dimensions of the gasket are set as described above, a preferred position is established in which the bead 18 of the gasket 10 is reliably interposed between the first seal surface 44 formed on the annular shoulder 42 of the first member 36 and the second seal surface 48 formed on the annular side wall 46 of the second member 40. Thus, the bead 18 exhibits a satisfactory sealing function.

The gasket 10 according to the embodiment of the present invention is basically constructed as described above. Next, its assembly method, function and effects shall be explained.

First, an explanation shall be made concerning a procedure for interposing the gasket 10 between the first member 36 (see FIG. 6) having a male thread section 33 and the second member 40 (see FIG. 10) having a female thread section 38 for being fitted onto the male thread section 33.

Figure 6:
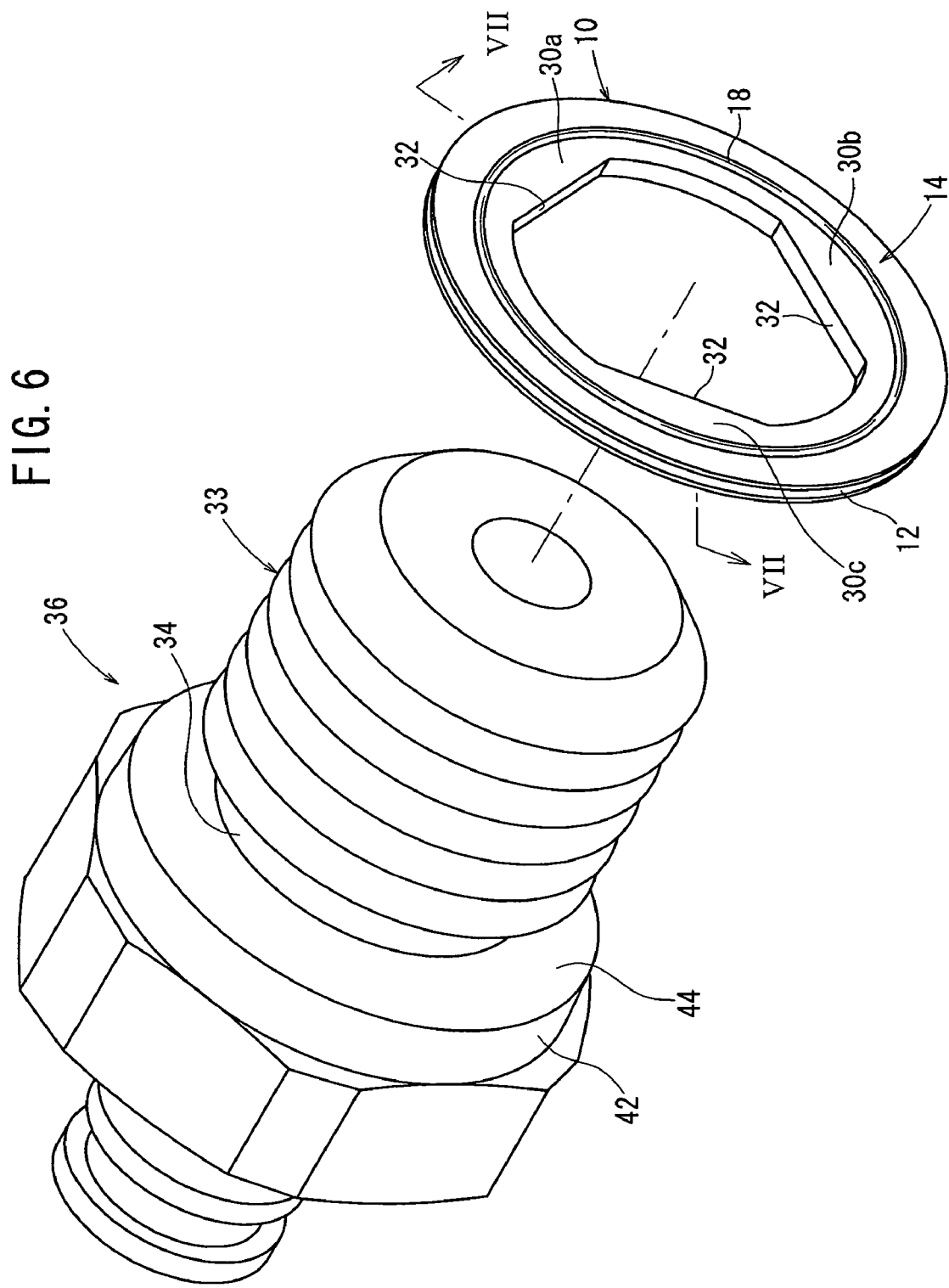
FIG. 6 shows a perspective view illustrating a state in which the gasket shown in FIG. 1 is assembled onto the male thread section of the first member.
Figure 7:
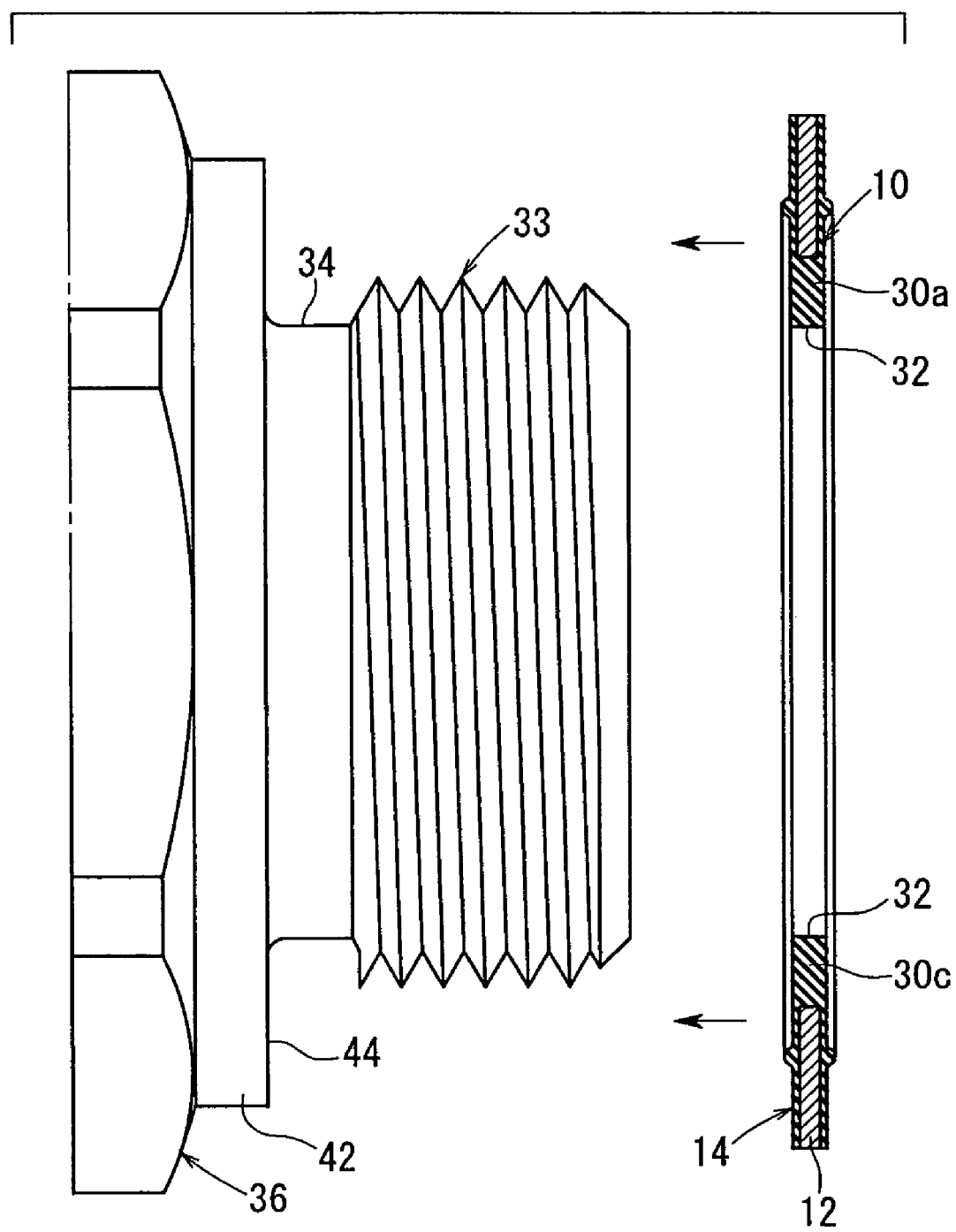
FIG. 7 shows a side view in which the gasket, depicted in a vertical cross section taken along line VII—VII shown in FIG. 6, is assembled onto the male thread section of the first member.

As shown in FIGS. 6 and 7, the gasket 10 is arranged at a position opposed to the male thread section 33 of the first member 36, and the gasket 10 is installed by pressing in the axial direction of the male thread section 33 toward the first seal surface 44 formed on the annular shoulder 42 of the first member 36.

Figure 8:
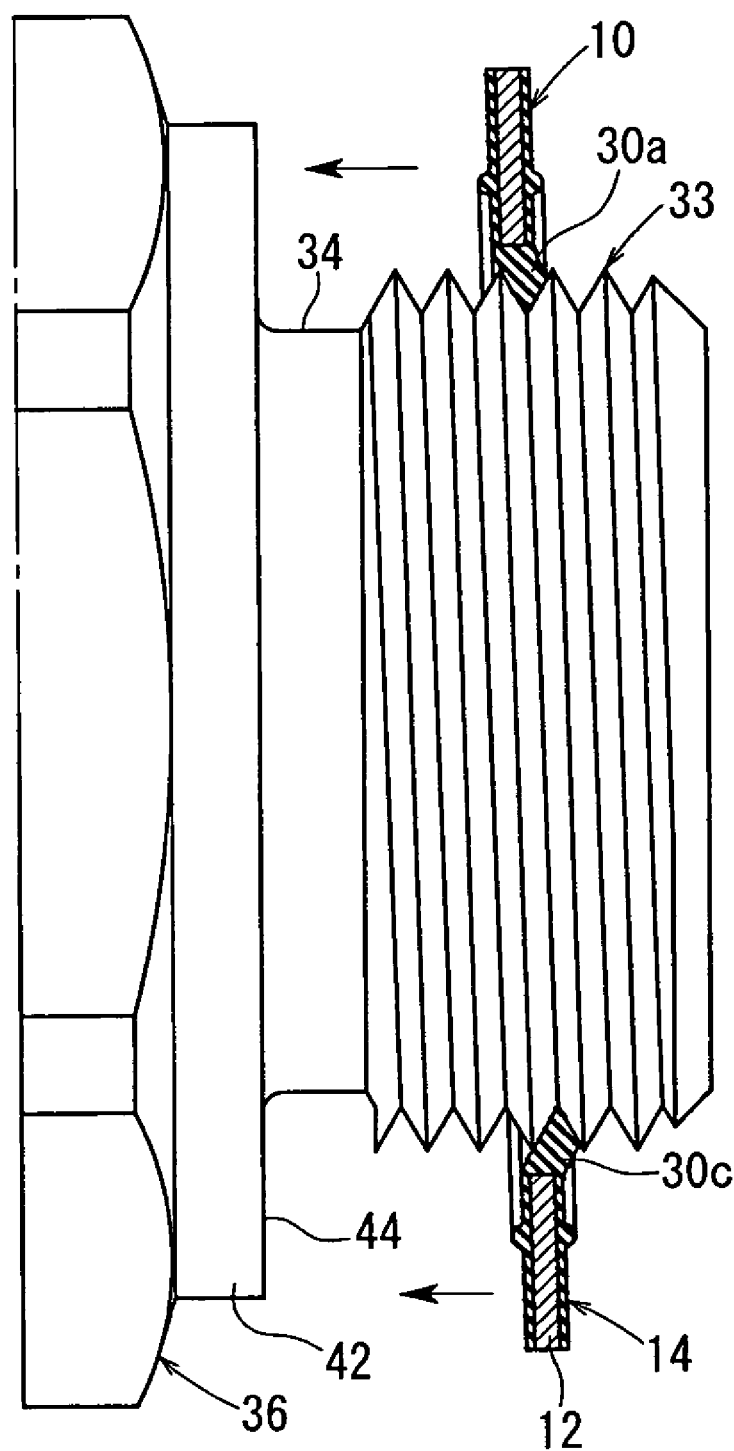
FIG. 8 shows a side view illustrating a state in which the gasket shown in FIG. 6 is installed onto the male thread section of the first member.

In this arrangement, as shown in FIG. 8, the first to third protruding sections 30a to 30c, which are formed on the inner circumference of the covering section 14, have dimensions such that a diameter D2 of an inscribing circle inscribing the linear side sections 32 is slightly smaller than the valley diameter Di of the male thread section 33. Further, the first to third protruding sections 30*a* to 30*c* are formed from a flexible elastic material. Therefore, as shown in FIG. 8, the first to third protruding sections 30*a* to 30*c* are pressed toward the first seal surface 44 of the annular shoulder 42 while being slightly deformed radially outwardly.

Figure 9:
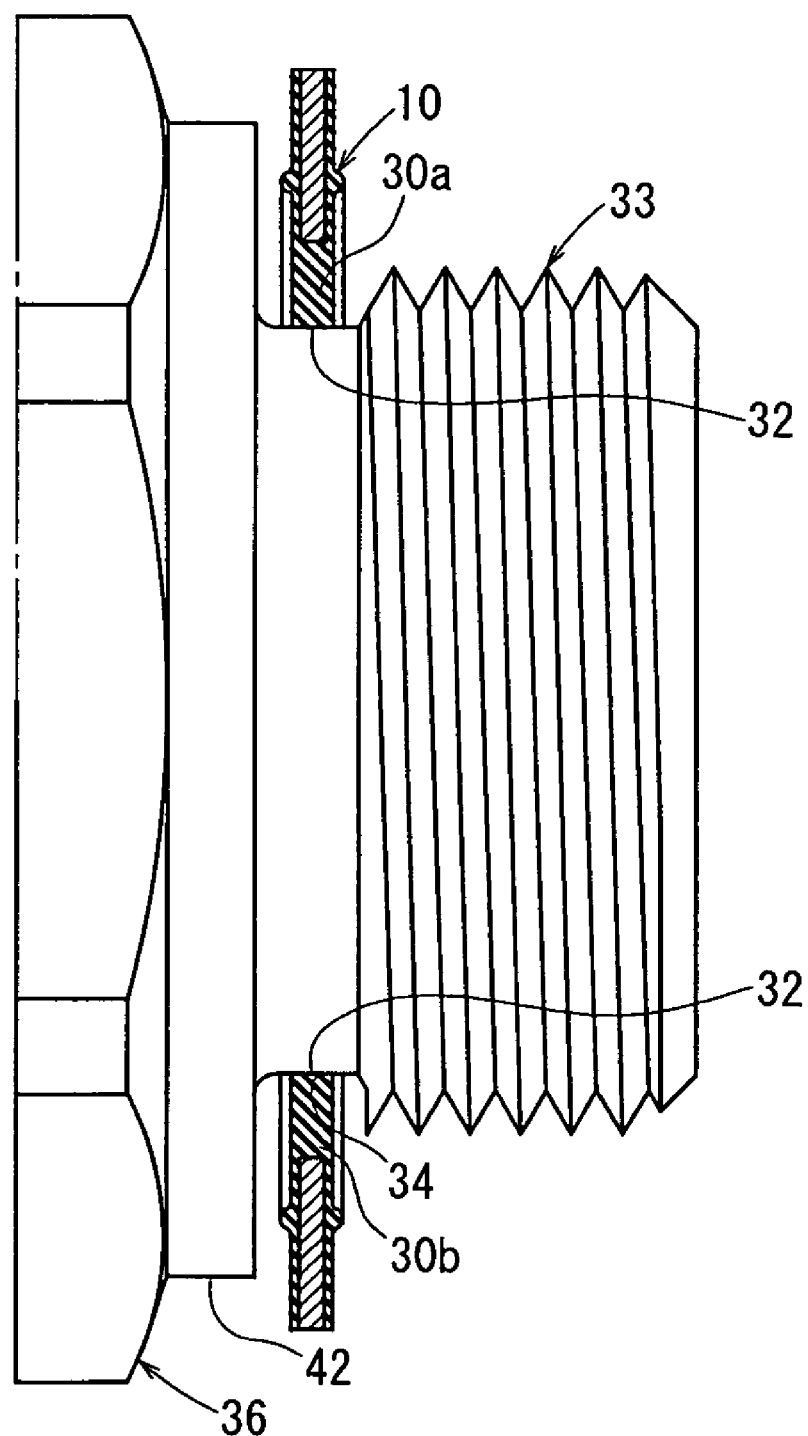
FIG. 9 shows a side view illustrating a state in which the gasket shown in FIG. 6 is installed onto a root section of the first member.

As shown in FIG. 9, when the gasket 10 is installed onto the root section 34 of the first member 36, the linear side sections 32 of the first to third protruding sections 30*a* to 30*c* are forcibly pressed toward the root section 34 as a result of the elastic force (restoring force) of the rubber material, and also because the diameter D2 of the inscribing circle inscribing the linear side sections 32 of the first to third protruding sections 30*a* to 30*c* is slightly smaller than the valley diameter Di of the male thread section 33.

Therefore, owing to the elastic force that forcibly presses the linear side sections 32 of the first to third protruding sections 30*a* to 30*c* toward the root section 34, even when the male thread section 33 of the first member 36 extends vertically downward, it is possible to reliably prevent the gasket 10 from becoming separated from the first member 36 due to falling or dropping off after the gasket 10 has been assembled onto the first member 36.

Figure 10:
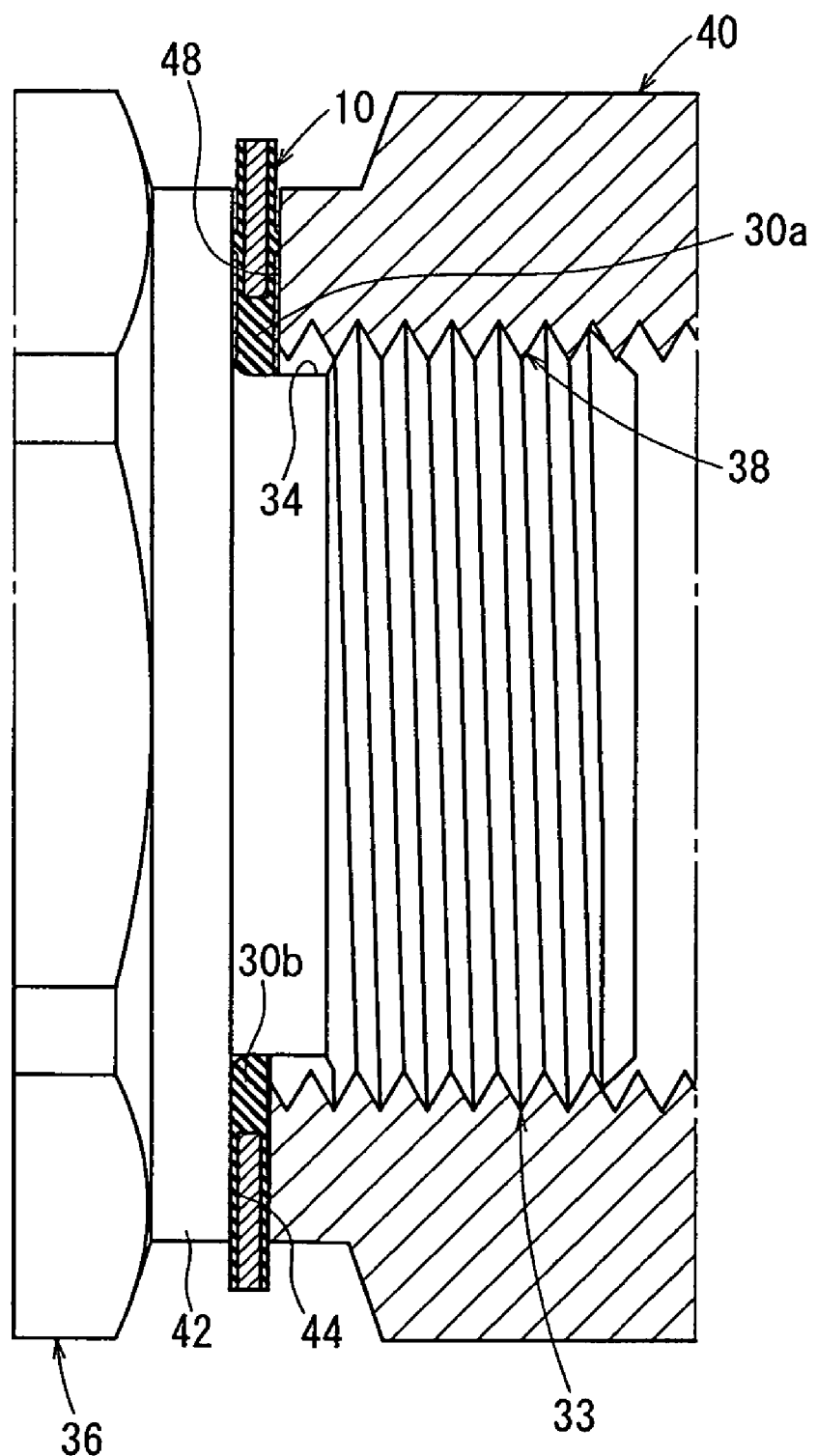
FIG. 10 shows a partial vertical sectional view illustrating a state in which the female thread section of the second member is screwed along the male thread section, after assembling the gasket shown in FIG. 6 to the first member, wherein the gasket is forcibly interposed between a first seal surface of the first member and a second seal surface of the second member.

Further, as shown in FIG. 10, the female thread section 38 of the second member 40 is threaded onto the male thread section 33 of the first member 36. Accordingly, the covering section 14 and the beads 18 are forcibly interposed therebetween to effect a sealing function between opposing surfaces of the first seal surface 44 formed on the annular shoulder 42 of the first member 36 and the second seal surface 48 formed on the annular side wall 46 of the second member 40.

As described above, the bead diameter D5 of the bead 18 is determined by dividing, by 2, the sum of the inner diameter D4 of the ring member 12 and the outer diameter Dh of the annular shoulder 42 on which the first seal surface 44 is formed, i.e., D5=(D4+Dh)/2. Accordingly, sealing is effected at a preferred position disposed substantially centrally between opposing surfaces of the first seal surface 44 and the second seal surface 48.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A gasket comprising:
a ring member made of a metal material; and
a covering section composed of an elastic material and which is formed to integrally cover first and second side surfaces and an inner circumferential surface of said ring member respectively, wherein said covering section comprises a first side surface section covering said first side surface of said ring member, a second side surface section covering said second side surface of said ring member, and an inner circumferential section covering said inner circumferential surface of said ring member,
wherein at least three protruding sections, which protrude radially inwardly by predetermined lengths, are provided on an inner circumference of said covering section, and
wherein beads are formed respectively on said first side surface section and said second side surface section of said covering section, said beads having a cross-sectional shape formed by a first lower slope section that rises at a predetermined radius of curvature from a first flat surface section of said covering section, a top section adjoining said lower slope section and which has a predetermined radius of curvature, and a second lower slope section adjoining said top section and which descends at a predetermined radius of curvature toward a second flat surface section of said covering section and wherein said first lower slope section, said top section, and said second lower slope section have the same radius of curvature respectively.

2. The gasket according to claim 1, wherein said at least three protruding sections consist essentially of three protruding sections, which are separated from each other by equal angles of 120 degrees in a circumferential direction respectively, and said three protruding sections have linear side sections adjoining circular arc-shaped inner circumferential sections and which communicate between said adjoining inner circumferential sections.

3. The gasket according to claim 2, wherein each of said three protruding sections is formed of an elastic material comprising nitrile rubber.

4. The gasket according to claim 2, in combination with a first member on which said gasket is assembled, said first member having a male thread section, wherein an inscribing circle, which inscribes said linear side sections of said three protruding sections, has a diameter (D2) that is smaller, by a predetermined value, than a valley diameter (Di) of said male thread section.

5. The gasket according to claim 4, wherein said diameter (D2) and said valley diameter (Di) are set to satisfy D2=Di−0.2 (mm).

6. The gasket according to claim 1, wherein said radius of curvature R of each of said first lower slope section, said top section, and said second lower slope section is 0.1 (mm).

7. The gasket according to claim 1, in combination with a first member on which said gasket is assembled, said first member having an annular shoulder, wherein a bead diameter (D5) of said beads is set to satisfy (D4 +Dh)/2 provided that Dh represents an outer diameter of said annular shoulder, said annular shoulder defining a first seal surface of said first member, and D4 represents an inner diameter of said ring member.

* * * * *